Aug. 11, 1970   C. BRYCE ET AL   3,523,821
ELECTRICALLY SCREENED FERROMAGNETIC FERRITE ELEMENT AND METHOD
Filed July 13, 1967
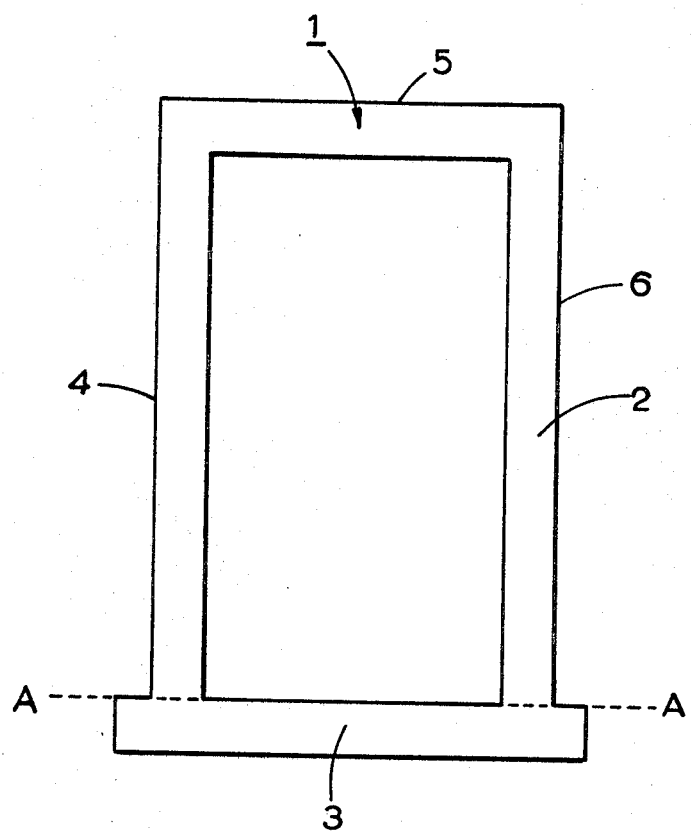
INVENTORS
CLEMENT BRYCE
BY   FRANK STANWORTH
JOHN TRAFFORD
AGENT

United States Patent Office 3,523,821
Patented Aug. 11, 1970

3,523,821
ELECTRICALLY SCREENED FERROMAGNETIC FERRITE ELEMENT AND METHOD
Clement Bryce, Frank Stanworth, and John Trafford, Southport, England, assignors, by mesne assignments, to U.S. Philips Corporation, New York, N.Y., a corporation of Delaware
Filed July 13, 1967, Ser. No. 653,112
Claims priority, application Great Britain, July 27, 1966, 33,785/66
Int. Cl. G11b 5/00; H01f 15/04
U.S. Cl. 117—227                  6 Claims

ABSTRACT OF THE DISCLOSURE

An electrically screened ferromagnetic ferrite element used principally as a storage element. A ferrite element is coated with a non-magnetic electrically conducting layer deposited from a suspension of a glass powder and an electrically conducting material in an organic solvent. The coated element is subsequently heated in air to convert the coating to an electrically conducting vitreous layer.

---

The invention relates to an electrically screened ferromagnetic ferrite element which is coated with a non-magnetic electrically conducting layer, and to a method of manufacturing such a screened ferrite element.

In computers, it may be desirable to coat a ferromagnetic ferrite core to be used as a storage core at least in part with a non-magnetic electrically conducting layer so that the storage element is protected from the influence of external electric fields. The desired screening was obtained hitherto by adhering a thin pre-formed metal foil to the storage element with the aid of a suitable adhesive, for example, an epoxy resin. The metal foils required are generally extremely thin. Their thickness frequently is of the order of 0.02–0.03 mm. Such extremely thin foils can be manufactured in practice only with great difficulty.

In the investigations which have led to the present invention, as a matter of course, the requirement was imposed that the screening coating layer should firmly adhere to the ferrite body. It has been found that a copper layer which was deposited electrolytically on a ferrite body which had previously been rendered electrically conducting by coating it with a thin graphite layer, did not fulfil this requirement.

The screening for the electrically screened ferromagnetic ferrite body according to the invention is obtained by applying to the ferrite body a non-magnetic electrically conducting vitreous layer. Such an electrically screened ferromagnetic ferrite body can be obtained in accordance with the invention by coating the ferrite body with a mixture of an organic solvent, a glass powder and an electrically conducting material and by subsequently heating in air the ferrite body thus coated so that the above mixture is converted to a vitreous electrically conducting layer.

In order that the invention may be readily carried into effect, it will now be described, by way of example, with reference to the accompanying diagrammatic drawing, which shows in sectional view a storage core combination.

EXAMPLE

The figure shows a combination 1 of ferromagnetic ferrite cores, this combination comprising a U-shaped core element 2 and a rod-shaped element 3 which interconnects the ends of the limbs of the U-shaped core. The combination 1 consists of a pre-fired product of the following composition, expressed in percent by molecule of the oxides in the following ratio:

| | |
|---|---:|
| $Fe_2O_3$ | 53.5 |
| $MnO$ | 23.25 |
| $ZnO$ | 23.25 |

The combination is obtained by moulding and sintering according to the methods usual for manufacturing ferrite bodies, the sintering process being carried out in a mixture of oxygen and nitrogen, in an adjustable mixing ratio, at a maximum temperature of approximately 1340° C.

After sintering and prior to the application of the mixture which is to provide the electrically screening coating layer, any unevennesses on the ferrite body are ground away, for example, by rapidly rotating the body in a vessel filled with ceramic scales. The core combination is then coated with a silver-containing mixture by immersing it in a suspension consisting for 50 to 60% by weight of silver, for 4 to 9% by weight of lead-boron-silicate glass, for 2 to 4½% by weight of a binder and for the remaining part of an organic solvent. A suitable binder is butyl methacrylate and in this case, a suitable solvent is butyl acetate. Another suitable binder is polyvinyl acetate and in this case a suitable solvent is the monoethyl ether of ethylene gylcol.

The ferrite core combination is then heated at a temperature lying between 120° C. and 160° C. Subsequently, it is immersed in the suspension which continues to be stirred. If desired, the suspension is heated before the ferrite core combination is immersed in it. The temperature must match the properties of the solvent and should not exceed the boiling point of the solvent by more than 15° C. The ferrite core combination treated with this suspension is then permitted to dry. Subsequently, two further new layers are applied in the same manner. In order to prevent a layer of non-uniform thickness from being deposited on the ferrite core combination from the suspension, a smooth current of air was passed along the ferrite body immediately after the latter had been removed from the suspension. The body was then heated in air for 15 minutes at 825° C. in a muffle furnace. Finally, the body was removed from the furnace and cooled in air.

The vitreous electrically conducting layer was found to adhere sufficiently firmly to the ferrite body, the electrical conductivity of this layer being also satisfactory. The layer had a thickness of approximately 0.08 mm. The rod-shaped part 3 was then separated from the U-shaped core element along the plane A—A and the coating layer was removed from the edges 4, 5 and 6 of the U-shaped core 2 by grinding, since otherwise shortcircuit could occur due to the presence of this coating layer.

The inductance of a storage core combination comprising a U-shaped element and a rod which were both coated by means of the above described method with a vitreous electrically conducting layer, was 6.3 µh. The inductance of a similar combination which, however, was not coated with such a layer, was 8.5 µh.

In order to fix the vitreous electrically conducting layer firmly on the ferrite body, this layer can be melted by heating in air at temperatures lying between 750° C. and 950° C. for a period of time varying from 1 hour to 2.5 minutes.

What is claimed is:
1. An electrically screened ferromagnetic ferrite element, characterized in that the element is screened by applying to it a non-magnetic electrically conducting vitreous layer.
2. An electrically screened ferromagnetic ferrite element as claimed in claim 1, characterized in that the vitreous layer contains silver.
3. A method of manufacturing an electrically screened ferromagnetic ferrite element comprising the steps of coating the element with a suspension consisting of an organic solvent, a glass powder and an electrically conducting material, and heating the element coated with this suspension in air so that a vitreous electrically conducting layer is formed thereon.

4. A method as claimed in claim 3, wherein the suspension consists for 50 to 60% by weight of silver, for 4 to 9% by weight of a lead-boron silicate glass, for 2 to 4% by weight of a binder and for the remaining part of an organic solvent.

5. A method as claimed in claim 4, wherein the element is provided with a coating layer by heating it at a temperature lying between 120° C. and 160° C. and by subsequently immersing it in the suspension.

6. A method as claimed in claim 5, wherein the element treated with the suspension is heated in air at a temperature between 750° C. and 950° C.

References Cited

UNITED STATES PATENTS 2,894,224    7/1959    Iverser _____ 117—234 XR

WILLIAM L. JARVIS, Primary Examiner

U.S. Cl. X.R.

117—234, 160; 335—301; 336—84; 340—174; 252—514